Jan. 9, 1951 H. FREEDMAN 2,537,454
DENTAL INSTRUMENT
Filed June 20, 1947 2 Sheets-Sheet 1
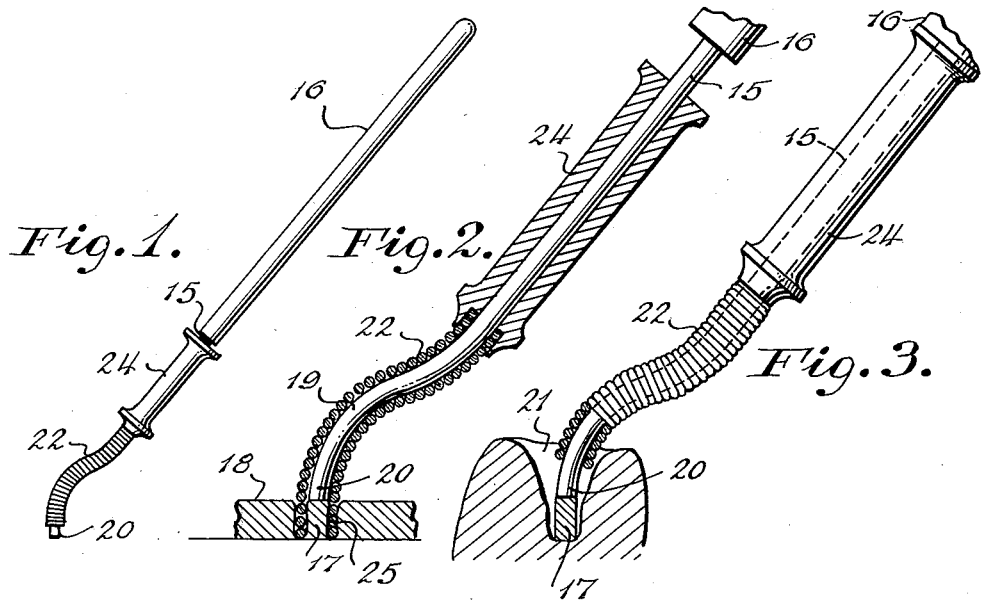
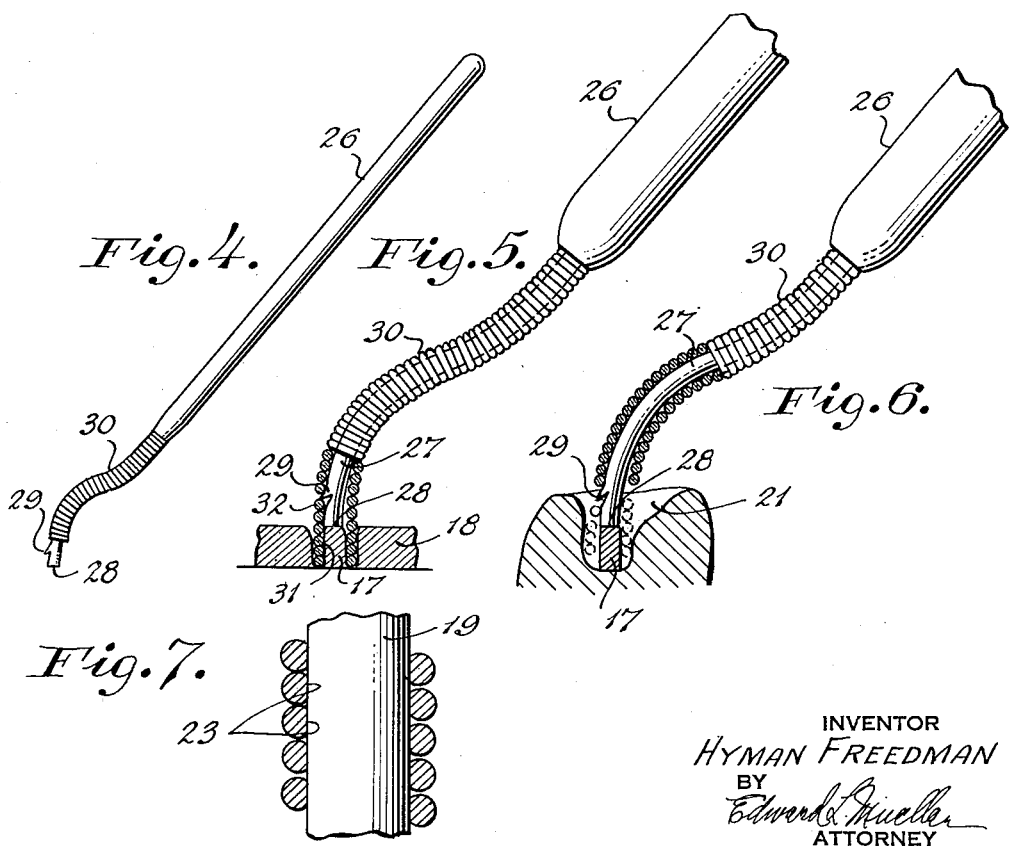
INVENTOR
HYMAN FREEDMAN
BY
Edward L. Mueller
ATTORNEY Jan. 9, 1951　　　　　　H. FREEDMAN　　　　　2,537,454
DENTAL INSTRUMENT
Filed June 20, 1947　　　　　　　　　　　　　　　2 Sheets-Sheet 2
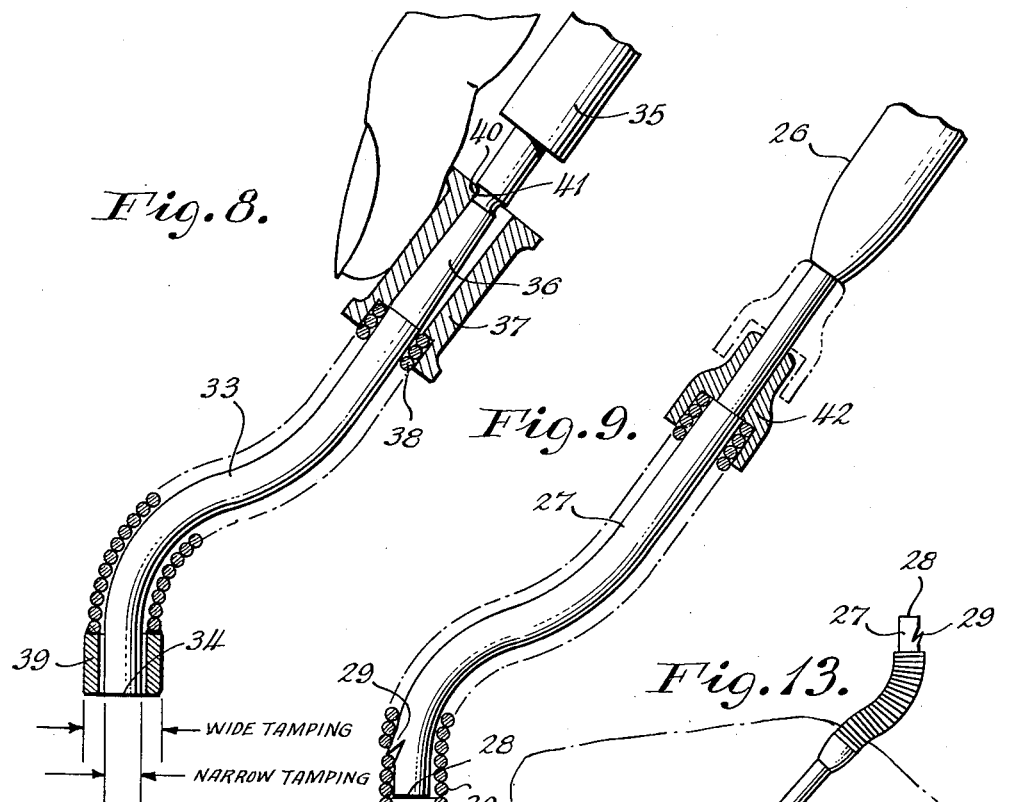
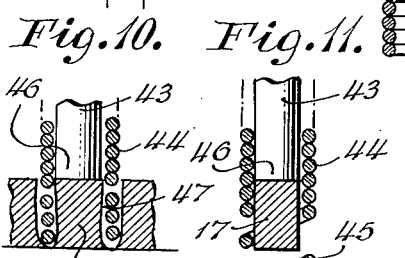
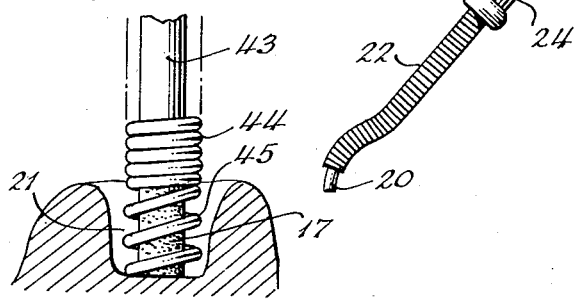
INVENTOR
HYMAN FREEDMAN
BY
　　*Edmund L. Mueller*
　　　　ATTORNEY Patented Jan. 9, 1951

2,537,454

UNITED STATES PATENT OFFICE 2,537,454

DENTAL INSTRUMENT

Hyman Freedman, New York, N. Y.

Application June 20, 1947, Serial No. 755,867

10 Claims. (Cl. 32—40)

This invention relates to improvements in dental instruments and has particular reference to a device employed in the filling of teeth.

An object of the invention is to provide an improved instrument of simple and practical construction which will facilitate the formation of a pellet from a quantity of filling material, the deposit of said pellet into a tooth cavity and the tamping thereof into said cavity.

The above and other objects will appear more clearly from the following detailed description when taken in connection with the accompanying drawings which illustrate preferred embodiments of the inventive idea.

In the drawings—

Fig. 1 is a side elevation of one form of instrument constructed in accordance with the invention;

Fig. 2 is an enlarged fragmentary longitudinal section therethrough, showing the instrument in the position assumed when gathering a pellet of filling material preparatory to its deposit into a tooth cavity;

Fig. 3 is an elevational view, partly in section, illustrating the manner in which the filling material is deposited into a cavity;

Fig. 4 is an elevation of another form of instrument;

Fig. 5 is a similar view, enlarged and partly in section, showing the position of the parts when gathering a pellet of filling material;

Fig. 6 is a view like Fig. 5 illustrating the deposit of the pellet into a cavity, the dotted lines indicating the position of the spring prior to the release of the pellet;

Fig. 7 is an enlarged fragmentary sectional view showing one type of spring which may be employed;

Fig. 8 is a fragmentary longitudinal sectional view of another form of instrument in which the tamping head thereof may be varied in size to adapt it for use in small and large tooth cavities;

Fig. 9 is a similar view of another form of instrument embodying one of the features of the form shown in Fig. 4;

Figs. 10, 11 and 12 are fragmentary sectional views of another form of the invention illustrating, respectively, the position of the parts when gathering a pellet of filling material, after the pellet is gathered, and when ejecting the pellet from the instrument into a cavity, and Fig. 13 is an elevation of still another form of instrument in which the forms of Figs. 1 and 4 are combined.

Referring to Figs. 1 to 3, the instrument herein is shown as comprising a rod-like member 15 attached at its inner end to a handle 16 adapted to be grasped when manipulating the device to gather a pellet 17 from a quantity 18 of filling material, such as amalgam. The inner portion of the member 15 is straight while its outer end is formed into a compound curve-like portion 19, the free extremity of which terminates in a tamping head 20. By reason of said curved portion, it will be apparent that the inner portion of the member 15 and the handle 16 of the instrument may be held in an inclined position while applying pressure to the head 20 in a direction substantially perpendicular to the bottom of a tooth cavity 21 during the tamping operation (Fig. 3), thus facilitating the work of a dentist, particularly when filling a molar.

Means are provided on the instrument for gathering the pellet 17 from the quantity of material 18 and for thereafter depositing the pellet into the tooth cavity 21 preparatory to tamping said pellet to form a filling. Said means consists of a resilient element 22 in the form of a coil spring slidable on the portion 19 of the member 15 and having the inner surfaces of its coils flattened, as indicated at 23 in Fig. 7, to facilitate such sliding movement along the curvatures of said portion 19. The inner end of said spring is secured to one end of a slide 24 mounted upon the straight portion of the member 15 and adapted to be moved therealong by a finger of the operator when grasping the handle 16. Preparatory to gathering a pellet 17, the slide 24 is moved to the position in Fig. 2 and, in so doing, the outer end of the spring 22 is projected beyond the tamping head 20 and thus combines therewith to form a cavity or recess 25 of any predetermined area depending upon the extent of such projection. With the spring thus held in position, its free end is embedded in the material 18 with the portion of the latter within the confines of said spring thus forming the pellet 17. The instrument is then withdrawn, carrying with it said pellet which is then introduced into the tooth cavity 21. Thereupon the slide 24 is withdrawn along the inner portion of the rod 15 and this action also withdraws the spring 22 to the position of Fig. 3, leaving the pellet 17 ejected from the recess 25 and deposited at the bottom of the cavity 21. The tamping head 20 is thus exposed so that it may have pressure applied thereto in the direction of the bottom of the cavity to pack the filling into the latter.

In the form of the invention shown in Figs. 4 to 6, the handle 26 has extending from one end thereof the rod-like member 27 formed into a compound curve similar to the portion 19 and for a like purpose. The free extremity of said member 27 terminates in a tamping head 28 and adjacent said head the member preferably has struck therefrom a projection 29 the function of which will be presently described. A coil spring 30, similar to the spring 22, is mounted on the rod 27 with one end fixed to the handle 26, and normally assumes the position of Fig. 4. By finger manipulation, the spring may be extended to and held in the position of Fig. 5 by expanding the same so as to combine with the head 28 to form a recess 31 which will receive a pellet 17 when the free end of the spring is embedded in the material 18. In order to maintain the spring in its extended position, its free end is flexed slightly to engage one of the convolutions 32 thereof with the projection 29, as in Fig. 5, and the spring will remain thus until and after the pellet 17 has been picked up. Said pellet is now introduced into the tooth cavity 21, as in Fig. 6, and, in order to release it from the spring the lower end of the latter is engaged with the bottom of said cavity, as shown in dotted lines, and the handle 26 is then given a lateral pull toward the operator which will release the convolution 32 from the projection 29 and thus permit the spring to recoil from its extended position, thereby leaving the pellet 17 deposited on the bottom of the cavity where it is subsequently tamped with the head 28 to form a filling.

Referring to Fig. 8, the rod-like member 33 is again curved like the portion 19 and terminates at its free extremity in a tamping head 34. The other end of said member is attached to a handle 35 and adjacent the latter, said rod has a tapered portion 36, the purpose of which will presently appear, over which a slide 37 is movable for manipulation by the operator, as indicated. To the sleeve is attached one end of the coil spring 38 which embraces the member 33 and is movable therealong. At the other end of the spring the same has soldered or otherwise secured thereto a sleeve or ring 39 which has an end face of substantial area so as to constitute an auxiliary tamping head for cooperation with the head 34 and also forms therewith a recess for receiving a pellet 17 when said sleeve is extended beyond said head 34 by a downward push upon the sleeve 37. After the pellet has been picked up, in a manner now understood, the sleeve 37 may be retracted so as to withdraw the sleeve 39 and thus deposit the pellet in the cavity 21 and, if said cavity should be a small one, said sleeve is retracted to such an extent that the sleeve or ring 39 will be withdrawn upwardly along the rod 33 to a position where only the head 34 is to be utilized for tamping the filling. On the other hand, should the cavity be a large one, the effective tamping area of the instrument may be increased by withdrawing the sleeve 39 only to the extent that its outer end will be flush with the head 34, as shown in Fig. 8. When tamping with the combined heads 34 and 39, it is desirable to provide means for retaining the latter head in the position described. It is for this purpose that the tapered portion 36 is provided which enables the sleeve 37 to be shifted laterally relative to said rod and thus engage a protuberance 40 in a groove 41 formed in the upper end of said portion 36. Finger pressure upon the sleeve 37, as indicated, is sufficient to retain the protuberance 40 in the groove 41 so that the heads 34 and 39 will be maintained in proper cooperative relationship while the tamping process proceeds.

In Fig. 9, the construction is quite similar to that shown in Figs. 4 to 6. Like the latter, a handle 26 is provided to which the member 27 is fastened and provided with a tamping head 28 at its free extremity and a projection 29 adjacent thereto for engaging a convolution of the coil spring 30 mounted on said member when said spring is extended beyond the head 28 for picking up a pellet 17. Unlike the first modification, the inner or upper end of said spring 30 is secured to a sleeve 42 slidable on said member 27, as indicated in full and dotted lines in Fig. 9, and adapted to be engaged by a finger of the operator to extend the spring or aid in retracting it to deposit the pellet into a cavity and expose the head 28 for tamping.

Figs. 10 to 12 illustrate a further modification in which a rod-like member 43 is provided similar to the previously described member and in which a coil spring 44 is mounted upon said member with its inner end fixed to a sleeve, as in Fig. 8. The outer end of said spring is distorted by having a few of its convolutions normally spaced apart, as indicated at 45. When gathering a pellet 17 from the material 18, as in Fig. 10, said convolutions 45 combine with the tamping head 46 to form a recess 47 for receiving said pellet as said convolutions are compressed by the downward pressure applied to the spring. Upon withdrawal of the spring from the material 18, said pellet will adhere to the spring and the convolutions 45 will again expand to normal position, as in Fig. 11. Then, after insertion of the free end of the spring into the cavity 21, only the handle 35 (Fig. 8) is grasped and pushed downwardly to force the rod 43 in a similar direction, whereupon the pellet 17 will be ejected from the coils 44 where it has been recessed, as in Fig. 12, onto the bottom of said cavity where it may be tamped after withdrawing the spring along the member 43 sufficiently to expose the head 46.

From Figs. 11 and 12 it will be apparent that the lowermost convolution of coil 44 is disposed at an angle to the axis of rod 43. This provides a sloping end configuration which facilitates discharge of filling material from the cavity formed when the coil is in its extended position. With this construction the lowermost extremity of the coil or of such other outer element which may be used, may be engaged with a tooth surface and there will still be space between the sleeve or coil and the bottom of the tooth cavity from which the filling material may be expelled. This can be demonstrated if one envisions the lowermost point on the left side of the coil in Fig. 1 placed against a flat surface and retained there as filling material located below tamper head 17 is ejected. It is apparent that filling material can escape more easily from below the lowermost point of the right hand portion of the coil than it could if the end of the coil were flat against the surface.

The form of the invention shown in Fig. 13 combines the modifications of Figs. 1 to 3 and 4 to 6 into one instrument by mounting said modifications at opposite ends of an elongated handle 48 so that the dentist may alternately choose either one of the devices. When used as shown in said figure, an enlarged portion 49 of the handle and a collar 50 spaced therefrom provide an area for receiving that part of the index finger adjacent the first joint and said parts 49 and 50 form abutments which will aid in steadying the finger during a tamping operation or when withdrawing the sleeve 24. When the position of the instrument is reversed from that of Fig. 13, then the sleeve 24 will rest against said finger joint and perform the same function as the abutments 49 and 50.

It will be noted that in the forms of the invention shown in Figs. 1 to 3, 8 and 10 to 12, the rod-like members 15, 33 and 43 are rotatable within the sleeves 24 and 37 respectively, when the latter are gripped by the middle finger and the handles 16 and 35 are held by the thumb and index finger, thus enabling the operator to turn said handles with the latter digits while maintaining said sleeves relatively fixed. This is of great advantage when inserting filling material into upper and lower cavities in successive operations and before the tamping operation, which is sometimes done in dentistry.

What is claimed is:

1. A dental instrument for use in filling teeth, comprising an inner rod-like member terminating at one end in a tamping head, and a resilient element slidably mounted on the exterior of said member and movable therealong to extended and retracted positions relative to said head, said element and head combining, when the former is extended, to form a cavity for receiving filling material and said element being thereafter retractable to cause said head to deposit said material into a tooth cavity and to expose said head so that it may be used for tamping said material.

2. A dental instrument for use in filling teeth, comprising an inner rod-like member terminating at one end in a tamping head, a resilient element slidably mounted on the exterior of said member and movable therealong to extended and retracted positions relative to said head, said element and head combining, when the former is extended, to form a cavity for receiving filling material, said element being thereafter retractable to permit of depositing said material into a tooth cavity and to expose said head so that it may be used for tamping said material, a handle for said rod-like member, a slide on said member between said handle and said tamping head, and a connection between said slide and said resilient element for manipulating the same.

3. A dental instrument for use in filling teeth, comprising an inner rod-like member terminating at one end in a tamping head, a resilient element mounted and slidable on the exterior of said member and movable therealong to extended and retracted positions relative to said head, said element and head combining, when the former is extended, to form a cavity for receiving filling material, said element being thereafter retractable to permit of depositing said material into a tooth cavity and to expose said head so that it may be used for tamping said material, and cooperating means between said element and member for releasably retaining the former in an extended position while said filling material is being received in said cavity.

4. A dental instrument for use in filling teeth, comprising an inner rod-like member terminating at one end in a curved portion the extremity of which forms a tamping head, a coil spring mounted and slidable on the exterior of said member and movable therealong to extended and retracted positions relative to said head, said spring and member combining, when the former is extended, to form a cavity for receiving a filling material and said spring being thereafter retractable to permit of depositing said filling material into a tooth cavity and to expose said head for tamping said filling, and means carried by said rod-like member and operable automatically upon extension and subsequent distortion of said spring to engage a coil thereof to releasably retain said spring in its extended position while receiving said filling material in said cavity.

5. A dental instrument for use in filling teeth, comprising an inner rod-like member terminating at one end in a curved portion the extremity of which forms a tamping head, a coil spring mounted and slidable on the exterior of said member and movable therealong to extended and retracted positions relative to said head, said spring and member combining, when the former is extended, to form a cavity for receiving a filling material and said spring being thereafter retractable to permit of depositing said filling material into a tooth cavity and to expose said head for tamping said filling, and a projection on said rod-like member operable, upon extension and subsequent flexing of said spring, to engage a coil thereof to releasably retain said spring in its extended and flexed position while receiving said filling material in said cavity, said coil being released from said projection by lateral pressure upon the flexed portion of said spring to permit the latter to restore to a retracted position.

6. A dental instrument for use in filling teeth, comprising an inner rod-like member terminating at one end in a tamping head, a resilient element mounted and slidable on the exterior of said member and movable therealong to extended and retracted positions relative to said head, a sleeve having a forward face of substantial area and affixed to said resilient element adjacent said tamping head, said sleeve forming a cavity, when said resilient element is fully extended, for receiving filling material and combining with said head, when said resilient element is retracted sufficiently to align said forward face approximately with the end of said tamping head, to increase the effective area of said head.

7. A dental instrument for use in filling teeth, comprising an inner rod-like member terminating at one end in a tamping head, a coil spring mounted and slidable upon the exterior of said member and having the coils at one end thereof distorted, said spring being movable along said member to extended and retracted positions relative to said head and the distorted portion of said spring being compressible to combine with said head to form a cavity for receiving filling material when the spring is in extended position, and means for moving said spring to retracted position to eject said filling material from said cavity.

8. A dental instrument as set forth in claim 6, a handle fixed to the rod-like member, a slide positioned on said member between said handle and said tamping head for manipulation by a finger of the user, said slide being connected to said resilient element, and a shoulder formed on said rod-like member for engagement by said slide to hold said resilient element in a tamping position in which the forward face of said sleeve is approximately aligned with the end of said tamping head.

9. A dental instrument for use in filling teeth, comprising an inner rod-like member terminating at one end in a tamping head, and a flexible, tubular element fitting closely about the exterior of said member and having an interior cross-sectional configuration matching the exterior cross-sectional configuration of said member, said tubular element being slidable along said rod-like member between an extended position in which it forms a cavity for receiving filling material and a retracted position to which it is movable to discharge filling material and to expose said head for use in tamping.

10. A dental instrument for use in filling teeth, comprising an inner, rod-like member terminating at one end in a tamping head, a tubular element, at least part of which comprises a resilient coil, mounted and slidable on the exterior of said member and terminating in an end surface sloped at an angle to the axis of said rod-like member, said element and said surface being movable along said member to extended and retracted positions relative to said head, said element when in extended position forming with said head a cavity for receiving filling material, which material is ejectable by retracting movement of said element, the sloping disposition of the end surface of said element facilitating discharge of filling material into a tooth cavity.

HYMAN FREEDMAN.

REFERENCES CITED

The following references are of record in the file of this patent:

UNITED STATES PATENTS

| Number | Name | Date |
|---|---|---|
| 829,119 | Mellen | Aug. 21, 1906 |
| 1,469,004 | Holtz | Sept. 25, 1923 |

FOREIGN PATENTS

| Number | Country | Date |
|---|---|---|
| 176,754 | Switzerland | July 1, 1935 |